(No Model.)
T. B. DENISTON.
THROAT PIECE FOR SCROLL OR OTHER SAWS.
No. 461,325. Patented Oct. 13, 1891.
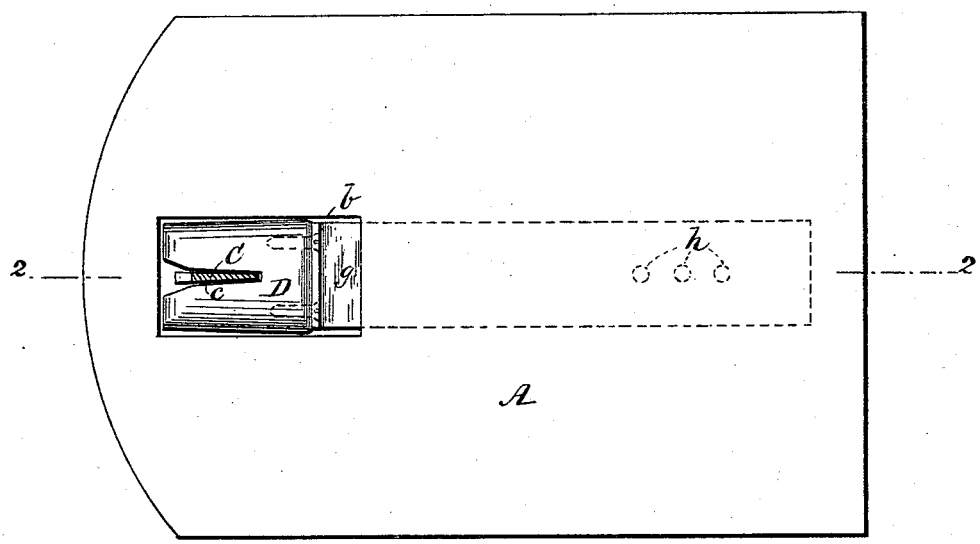
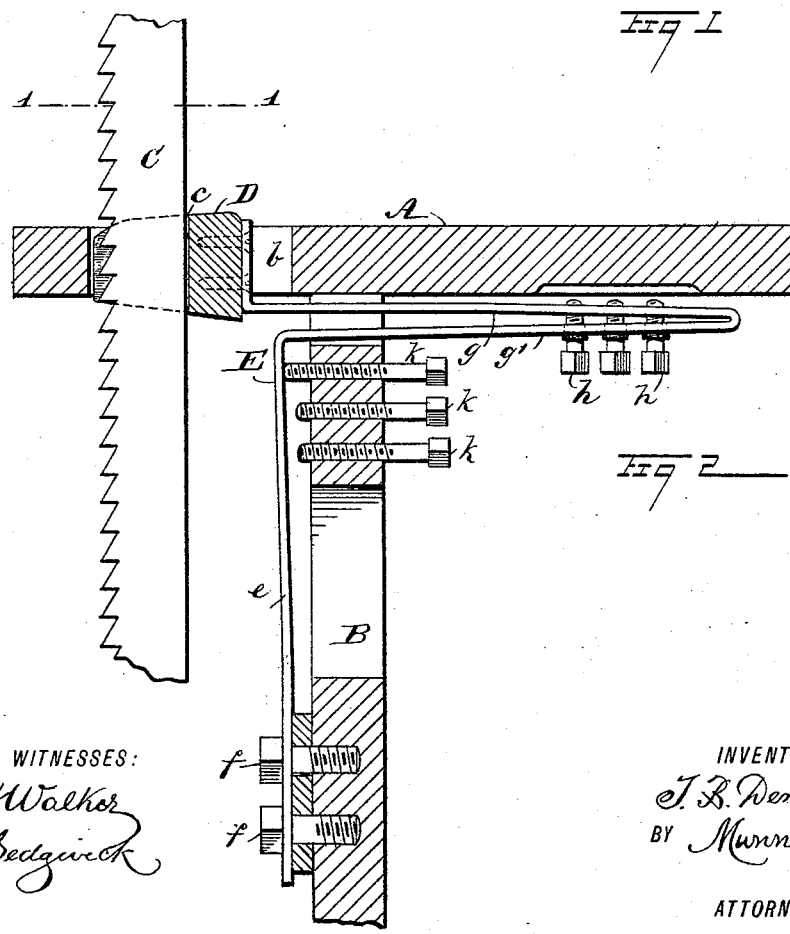
WITNESSES:
H. Walker
C. Sedgwick
INVENTOR:
T. B. Deniston
BY Munn & Co.
ATTORNEYS

United States Patent Office.

THOMAS B. DENISTON, OF PERU, INDIANA.

THROAT-PIECE FOR SCROLL AND OTHER SAWS.

SPECIFICATION forming part of Letters Patent No. 461,325, dated October 13, 1891.

Application filed January 20, 1891. Serial No. 378,447. (No model.)

*To all whom it may concern:*

Be it known that I, THOMAS B. DENISTON, of Peru, in the county of Miami and State of Indiana, have invented a new and useful Improvement in Throat-Pieces for Scroll and other Saws, of which the following is a full, clear, and exact description.

This invention relates to devices used on sawing tables or stands in connection with scroll and band or jigger saws employed in cutting or sawing out different kinds of ornamental or bracket work and in sawing out the centers of sewing-machine tables for the reception of the machine or its mechanism.

The invention consists in a peculiary constructed and acting table throat-piece for such and other like saws, substantially as hereinafter described, and more particularly pointed out in the claims, and the special purpose of which is to prevent that tearing or breaking out of the wood on the under side of the piece worked by the saw, so that in cutting across the grain or in other directions the wood will not be mutilated, as heretofore has been the case in working these saws.

To more particularly describe the nature of my invention, it may be referred to as a yielding throat-piece or device that in its normal position does not stand lower than or a little above the top of the saw-table and is capable of remaining in the same close connection to the working saw as if the latter were still; also capable of being depressed to a level with the top of the saw-table by the weight of the piece being sawed and while so depressed of automatically moving backward and forward, due to the rake or pitch of the saw.

Heretofore in jig-sawing—as, for instance, in sawing out the centers of sewing-machine tables—a stationary hard wooden block or throat-piece has been used, which operates fairly for a short time; but when any short turns are to be made in the sawing the throat in this wooden block, through which the saw works, becomes so enlarged that the tearing or breaking out of the wood under operation on its under side begins and after a few such operations rapidly gets worse and worse, until a new throat-piece has to be put in. This takes time and is very unsatisfactory; nor is the evil much remedied by employing a sliding wooden throat-piece adjustable by hand and capable of being set or moved up against the saw as the throat becomes enlarged, which causes the saw to cut a new throat for itself. My invention practically and automatically removes these objections, no matter how hard or cross-grained the wood being sawed.

Reference is to be had to the accompanying drawings, forming a part of this specification, in which similar letters of reference indicate corresponding parts in both the figures.

Figure 1 represents a saw-table in part, omitting the legs, showing also the saw in transverse section on the line 1 1 in Fig. 2 and with my invention in an available form applied; and Fig. 2 is a partly-sectional elevation of the same upon the line 2 2 in Fig. 1.

A indicates the saw or working table in part, and B an under upright piece attached to said table immediately in rear of the throat-piece opening $b$ in the table; C, the jig or other like saw, and D the throat-piece or block through the throat $c$, in which the saw works. The throat or block D is made of hard, preferably very hard, metal; so that it will have no tendency to stick or adhere when the saw is at work. Said throat-piece or block D is constructed to inclose by its throat $c$ the saw completely, excepting in front. To do this, said block is made red hot and the saw driven into it, and so that the close throat $c$ extends from the back of the saw up to or beyond the saw-teeth. Thus the points of the saw-teeth cannot possibly catch against the sides of the throat on account of the very limited play the saw has within the throat. Especially is this so if the throat-piece or block D is very hard and has just a little looseness on the upper side of the throat. Of course each saw of different thickness will require its own special throat-piece or block with throat in it to suit; but the result will be the same.

The invention is more especially designed for saws that are made thinner on their back than in front, so that it is not necessary to put any set in the teeth; but if set is used then the throat in the block at the sides and points of teeth (only) must be a trifle wider.

In some kinds of scroll or jig sawing—as, for instance, in sawing the center opening in sewing-machine tables—it is usually necessary to have the throat-piece stand somewhat higher than the surface of the saw-table—say one-quarter of an inch or thereabout—and yet be capable of being depressed down level with the upper surface of the saw-table for the following reasons: In hanging the leaf of the sewing-machine table it is done so that the leaf will hang below a horizontal line and on being laid on the saw-table will keep the body of the sewing-machine table raised above the saw-table, except at the two ends, and if the sewing-machine table is sawed in this condition there will be a great clattering of the latter on the saw-table. Besides such would not prevent the tearing or mutilating of the under side of the piece being cut, no matter how close the throat might be nor of what material it was made; but my invention obviates this, because my throat-piece or block is arranged to stand one-eighth of an inch, more or less, above the top of the saw-table and is capable of having its normal position up or down changed, as required, and has a yielding action in two different directions, as required. Thus the throat-piece or block D is carried by a spring E, which is mainly composed of an upright arm or leg $e$, fastened below, as by screws $f$, to the under piece B of the saw-table and then doubled over upon itself in a substantially horizontal and backward direction beneath the saw-table, forming upper and lower leaves $g$ $g'$, the upper one $g$ of which is attached to and carries at its forward end the throat-piece D. One or more set-screws $h$, applied to this doubled-over horizontal portion of the spring serves by their adjustment to raise or lower, as required, the throat-piece or block above the saw-table. Thus by raising in this manner the throat-piece or block, say, one-eighth of an inch above the top of the saw-table it will be high enough to reach the under side of a sewing-machine table being operated on by the saw, thereby allowing the sewing-machine table to rest upon the throat-piece D.

Furthermore, the upright leg $e$ of the spring has a series of set-screws $k$ $k$ $k$, arranged one above the other, controlling it and serving to admit of the throat-piece D vibrating back and forward with the motion of the saw, according to pitch or rake of the saw and always keeping the throat $c$ just about the same, whether there is much or little rake. If the nature of the work is such that no rake or pitch of saw is desired, then the back of the saw is to be stoutly supported by means of one of the upper set-screws $k$, which strikes the back of the upright leg $e$ of the spring. Where much rake is used, the lower one of the set-screws $k$ is brought into operation, and where there is only a medium rake then the middle set-screw $k$ is used to control the backward and forward vibration of the spring. The horizontal or doubled-over portion $g$ $g'$ of the spring, being made adjustable, as described, not only serves to raise or lower the throat-piece or block D above the saw-table, but, in connection with the backwardly and forwardly vibrating leg $e$, gives to the spring a twofold action and assists in preventing all jarring and clattering of the work on the saw-table, and not only does away with objectionable noise, but assists in reducing the strain on the machinery or driving-power, besides preventing or lessening the liability of breaking the saw, to say nothing of better and faster sawing being done, because of the support which is secured directly under the part of the table most affected by vibration.

Another use or absolute necessity of having the spring thus made to give a twofold action is this: When much rake is used in the saw, the throat-piece has and must have a backward movement as the saw is rising for its downward stroke or cut. Now, if the throat-piece was fixed on an upright spring alone it would be compelled to rise higher on its backward movement, no matter how much weight rested on it; but much weight resting on the throat-piece would be liable to break the saw as it was being raised for the downstroke. Here the horizontal part of the spring comes into play and overcomes this difficulty by allowing the throat-piece to be depressed, also, as well as of being moved backward, and the throat-piece is prevented from rising any higher or going any lower according to the fastening of the upright portion of the spring at its foot relatively to the back of the saw.

In some jig-saws a lower guide for the saw, carried by a single-acting spring and arranged below the saw-table, has been used in addition to a stationary and separate throat-piece in the saw-table; but my invention as herein described combines in the one device both the lower guide and throat-piece.

Having thus described my invention, I claim as new and desire to secure by Letters Patent—

1. In jig and other like saws, the combination, with the saw and its working table, the latter having a throat-piece opening, of a throat-piece or block adapted to move up and down and backward and forward within said opening and provided with a throat-aperture constructed to closely fit or hug within it the saw at its sides and back, substantially as specified.

2. In jig and other like saws, the combination, with the saw and its working table, the latter having a throat-piece opening, of a throat-piece or block provided with a throat-aperture through it, constructed to closely fit or hug within it the saw at its sides and back, and a spring attachment or appliance carrying said block and adapted to provide for the up-and-down movement of the block above and down to the level of the working table and backward and forward in a substantially horizontal direction, essentially as specified.

3. In jig and other like saws, the combination, with the saw and its working table, the latter having a throat-piece opening, of a throat-piece or block provided with a throat-aperture through it, constructed to closely fit or hug within it the saw at its sides and back, and a double-acting adjustable spring carrying said block and adapted to provide for the up-and-down movement of the block above and down to the level of the working table and backward and forward in a substantially horizontal direction, essentially as set forth.

4. In jig and other like saws, the combination of the saw D and its working table A, the latter having an elongated throat-piece opening b, the hard-metal throat-piece or block D, provided with a throat-aperture c through it, constructed to closely fit or hug within it the saw at its sides and back, and the spring E, connected with the table and carrying said block, composed of an upright leg e and doubled-over horizontal portion g g' and provided with adjusting means, substantially as described, adapted to control the up-and-down and backward-and-forward movements of the spring, essentially as and for the purposes herein set forth.

THOMAS B. DENISTON.

Witnesses:
JABEZ T. COX,
CHAS. BOOTS.